(12) United States Patent
Burmester et al.

(10) Patent No.: US 11,415,229 B2
(45) Date of Patent: Aug. 16, 2022

(54) LIFTING VALVE AND SEAL

(71) Applicant: GEA Tuchenhagen GmbH, Büchen (DE)

(72) Inventors: Jens Burmester, Grambek (DE); Jörg Pieplow, Lübeck (DE); Matthias Südei, Ratekau (DE); Nils Waldemann, Nostorf (DE)

(73) Assignee: GEA Tuchenhagen GmbH, Büchen (DE)

( * ) Notice: Subject to any disclaimer, the term of this patent is extended or adjusted under 35 U.S.C. 154(b) by 0 days.

(21) Appl. No.: 17/261,085

(22) PCT Filed: Jul. 16, 2019

(86) PCT No.: PCT/EP2019/069080
§ 371 (c)(1),
(2) Date: Jan. 18, 2021

(87) PCT Pub. No.: WO2020/016211
PCT Pub. Date: Jan. 23, 2020

(65) Prior Publication Data
US 2021/0254723 A1      Aug. 19, 2021

(30) Foreign Application Priority Data
Jul. 19, 2018   (DE) ............ 10 2018 005 699.7

(51) Int. Cl.
*F16K 1/46*     (2006.01)
*F16K 1/38*     (2006.01)
(Continued)

(52) U.S. Cl.
CPC ............ *F16K 1/465* (2013.01); *F16J 15/025* (2013.01); *F16K 1/38* (2013.01); *F16K 1/46* (2013.01); *F16K 25/00* (2013.01); *F16J 15/062* (2013.01)

(58) Field of Classification Search
CPC ... F16K 1/465; F16K 1/38; F16K 1/46; F16K 25/00; F16J 15/062; F16J 15/025; F16J 15/106
(Continued)

(56) References Cited

U.S. PATENT DOCUMENTS 2,260,381 A     10/1941  Kennon
3,131,906 A *    5/1964  King ................. F16K 1/425
                                                251/315.08
(Continued)

FOREIGN PATENT DOCUMENTS

CN       1293329 C      1/2007
DE    1 098 311 B       1/1961
(Continued)

*Primary Examiner* — John Bastianelli
(74) *Attorney, Agent, or Firm* — Young Basile Hanlon & MacFarlane, P.C.

(57) ABSTRACT

A lifting valve includes a first and a second connection, a passage connecting the first and second connections and surrounded by a valve seat, a closing element that can be brought into sealing contact with the valve seat, and an actuator to bring about the sealing contact. The closing element includes a sealing arrangement comprising a first part, a second part releasably connected to the first part, a first groove formed in the first part, a second groove, and a clamping gap. The second groove and clamping gap are formed between the first and second parts, and a seal comprising a first leg, a second leg, and a third leg is received in the sealing arrangement. The first leg is received in the first groove, the second leg is received in the second groove, and the third leg is received in the clamping gap.

12 Claims, 3 Drawing Sheets

(51) Int. Cl.
*F16J 15/02* (2006.01)
*F16K 25/00* (2006.01)
*F16J 15/06* (2006.01)

(58) Field of Classification Search
USPC .............................................. 251/332, 334
See application file for complete search history.

(56) References Cited

U.S. PATENT DOCUMENTS

| | | | | |
|---|---|---|---|---|
| 4,676,481 | A * | 6/1987 | Hayes | F16K 1/222 |
| | | | | 251/173 |
| 5,067,521 | A * | 11/1991 | Jenks | F16K 11/044 |
| | | | | 251/366 |
| 5,082,020 | A * | 1/1992 | Bailey | E21B 33/13 |
| | | | | 137/902 |
| 6,840,504 | B2 * | 1/2005 | Hagiwara | F16K 1/36 |
| | | | | 251/332 |
| 7,909,057 | B1 * | 3/2011 | Vicars | F16K 1/46 |
| | | | | 251/332 |
| 8,317,498 | B2 * | 11/2012 | Gambier | F04B 53/1097 |
| | | | | 417/454 |
| 9,291,274 | B1 * | 3/2016 | Blume | F16K 1/46 |
| 9,671,027 | B2 * | 6/2017 | Morein | F16K 5/0668 |
| 2002/0104571 | A1 | 8/2002 | Hess et al. | |
| 2014/0203201 | A1 | 7/2014 | Kinser | |
| 2017/0037974 | A1 | 2/2017 | Sauer | |

FOREIGN PATENT DOCUMENTS

| | | |
|---|---|---|
| DE | 1 110 483 B | 7/1961 |
| DE | 24 03 773 A1 | 2/1975 |
| DE | 100 23 582 A1 | 11/2001 |
| DE | 10 2010 030 300 A1 | 12/2011 |
| DE | 10 2015 215 089 A1 | 2/2017 |
| EP | 2 252 819 B1 | 9/2012 |

* cited by examiner

LIFTING VALVE AND SEAL

TECHNICAL FIELD

The invention relates to a lifting valve and a seal.

BACKGROUND

A valve, for example a lifting valve, comprises a closing element that can be brought into sealing contact with a valve seat in order to produce a blocking effect in a closed position. This is often facilitated by a seal, which is arranged on the closing element and cooperates with the valve seat in the closed position.

Generic lifting valves are commonly used to control the flow of beverages and foodstuffs as well as of products and prototypes of the pharmaceutical and biotechnology industries.

It is known to design seals of this kind as sealing rings, the cross-section of which differs from a simple toroidal sealing ring. For example, cross-sections based on trapezoidal shapes or V-shaped cross-sections are used.

A seal having a substantially C-shaped cross-section is presented in DE 10 2010 030 300 A1. In order for this seal to perform its function, a dimensionally-stable support ring is additionally provided, which is received at least in part in the C-shape.

BRIEF SUMMARY

An object of the disclosure is to provide a lifting valve and a seal that are cost-effective and that meet the hygiene requirements placed on the lifting valve.

A lifting valve described herein comprises a first connection, a second connection, a passage connecting the first connection to the second connection and surrounded by a valve seat, a closing element, which can be brought into sealing contact with the valve seat, and an actuator for bringing about the sealing contact. The closing element comprises a sealing arrangement comprising a first part and a second part that is releasably connected to the first part, a first groove formed in the first part, a second groove, and a clamping gap, wherein the second groove and clamping gap are formed between the first part and the second part. Furthermore, a seal having a first leg, a second leg, and a third leg is received in the sealing arrangement, and the first groove, second groove, and clamping gap are filled to the highest possible degree. The first leg is received in the first groove, the second leg is received in the second groove, and the third leg is received in the clamping gap. The advantages of this lifting valve can in particular be seen in a simple geometry of the sealing arrangement that can be produced in a cost-effective manner in few machining steps, for example by means of turning, and in the very good hygienic properties of the lifting valve, which are achieved on account of the high filling degree and the high degree of sealing in the clamping gap. Because the seal emerges from the closing element and makes contact with the valve seat, a very good sealing effect is produced for the lifting valve.

The hygienic properties are improved compared to the prior art by the support effect produced by the arrangement of the grooves and clamping gap, as it prevents the seal from being pressed into the groove.

The support and deformation of the seal and thus the hygienic property are improved if the degree to which the first groove, second groove, and clamping gap are filled is more than 95%.

Another improvement is achieved by the first groove, second groove, and clamping gap being filled to a degree of more than 98%.

The flow of force within the seal and subsequent deformation is improved and, as a result, a better sealing effect is produced by the first groove and second groove being at an angle of 90° to one another.

Another improvement to the above-mentioned advantages is achieved if the clamping gap is at an angle of 135° to the second groove.

In one development, a cost-effective, easy-to-manufacture, and operationally reliable connection between the first and second part is achieved in that, in order to releasably connect the first part and second part, the first part comprises a threaded portion that adjoins one end of an expansion portion and that is received in a hole arranged on the second part.

The operational reliability of the above-mentioned connection is increased further in that the closing element is designed to guide a flow of force past the threaded portion and hole in a closed state of the valve.

This development is improved further in that an inner width of the valve seat is at least as large as an outer width of the first part. As a result, the closing force is prevented from acting on the screw connection.

According to another development, a projection is provided in the passage, which projection creates a narrowing having an inner width that is smaller than an outer width of the first part. This prevents the first part from passing through the passage.

A seal is proposed for a lifting valve of the type described above, which seal comprises a ring that has a cross-section having a core, a first leg, a second leg, and a third leg, wherein the legs branch off from the core and the first leg points toward a center of the ring and forms a pair with the second leg. The third leg is arranged on a side of the core that is opposite the pair, wherein the third leg is less thick than the first and second legs. This seal produces a good sealing effect and very high resistance to contamination. It can also be produced cost-effectively and installed easily.

A very high degree of filling of the sealing arrangement with an improvement in the sealing effect and the resistance to contamination is achieved in that, in one development, at least one out of the first and second leg has a taper, by means of which a width of the leg decreases from the core to the free end.

The advantages are enhanced in another development in that the first leg and the second leg are at an angle of 90° to one another.

A further enhancement to the advantages is produced by a development according to which the third leg is at an angle of 135° to the second leg.

According to another development, the first leg substantially lies in a plane that is spanned by the core. This simplifies manufacture and improves ease of installation and the flow of force in the closed state of the valve.

The invention will be explained in greater detail and the effects and advantages expounded in greater depth in the following based on an exemplary embodiment and the developments thereof.

DETAILED DESCRIPTION

Figure 1:
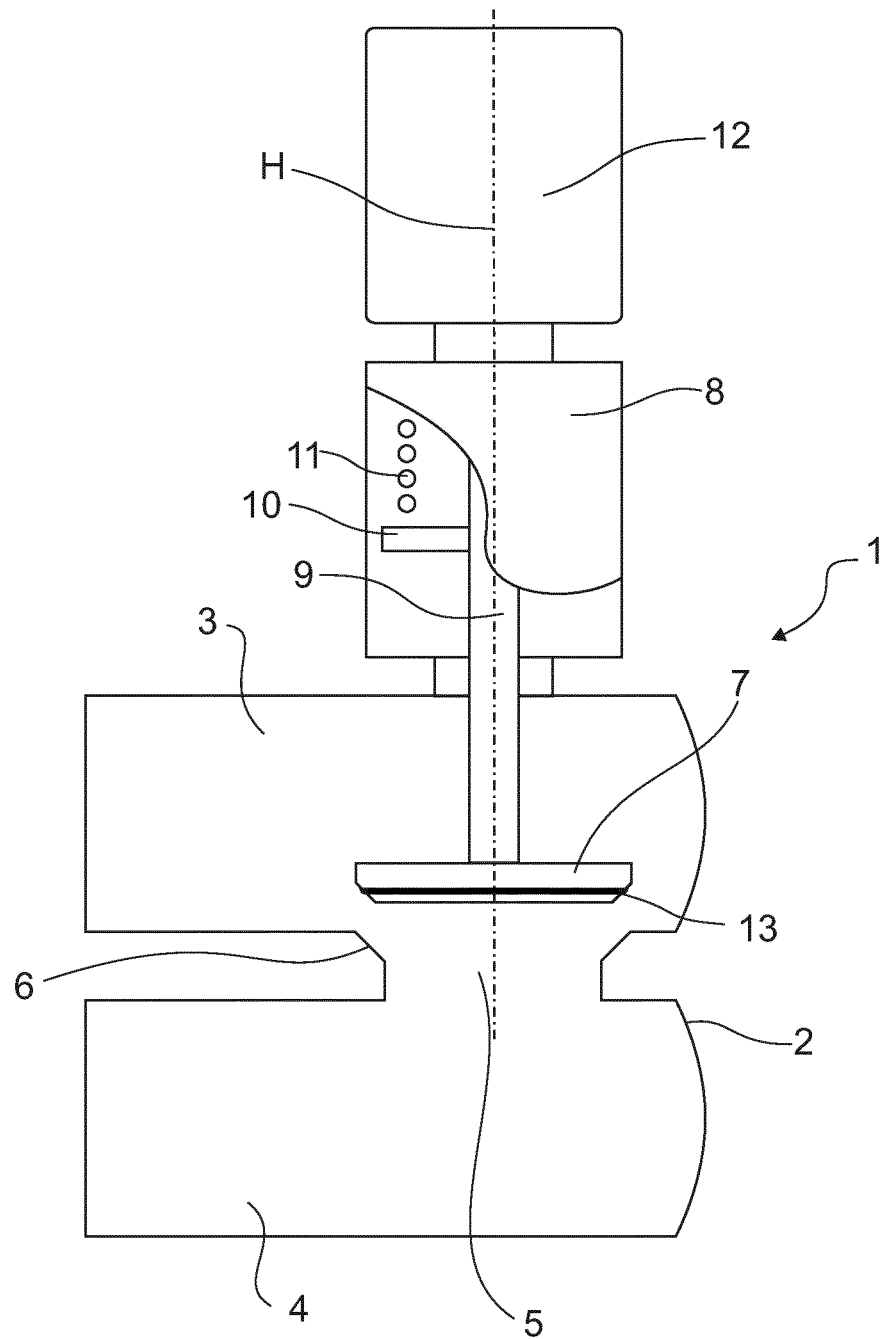
FIG. 1 shows a partial section through a schematically represented lifting valve.

FIG. 1 schematically shows a valve 1 in a partial section. The valve 1 comprises a valve housing 2, on which a first connection 3 and a second connection 4 are provided. A passage 5 that establishes a fluid connection between the first connection 3 and the second connection 4 is arranged in the valve housing 2. The passage 5 is delimited by a valve seat 6. A closing element 7 arranged to be movable along a lift axis H is arranged inside the valve housing 2. Said closing element 7 can be brought into sealing contact with the valve seat 6 in order to produce a closed position of the valve 1, in which the fluid connection between the first connection 3 and the second connection 4 is blocked by the combined effect of the valve seat 6 and the closing element 7.

An actuator 8 is provided, by means of which the closing element 7 can be moved. A drive rod 9 connects the actuator 8 to the closing element 7. The actuator 8 may be pneumatic and comprise a piston 10, which is moved by means of a pressure medium against the force of a spring 11 and thus generates lift, which is transferred via the drive rod 9 to the closing element 7.

A valve control apparatus 12 may be provided, which triggers the actuator 8, for example by providing the inflow of pressure medium into the actuator 8 in order to move the piston 10. The valve control apparatus 12 may be designed to directly or indirectly cooperate with a system controller, e.g. by reporting back the valve status and receiving and executing switching commands.

A seal 13 that is in sealing contact with the valve seat 6 in the closed position of the valve 1 is provided on the closing element 7.

Figure 2:
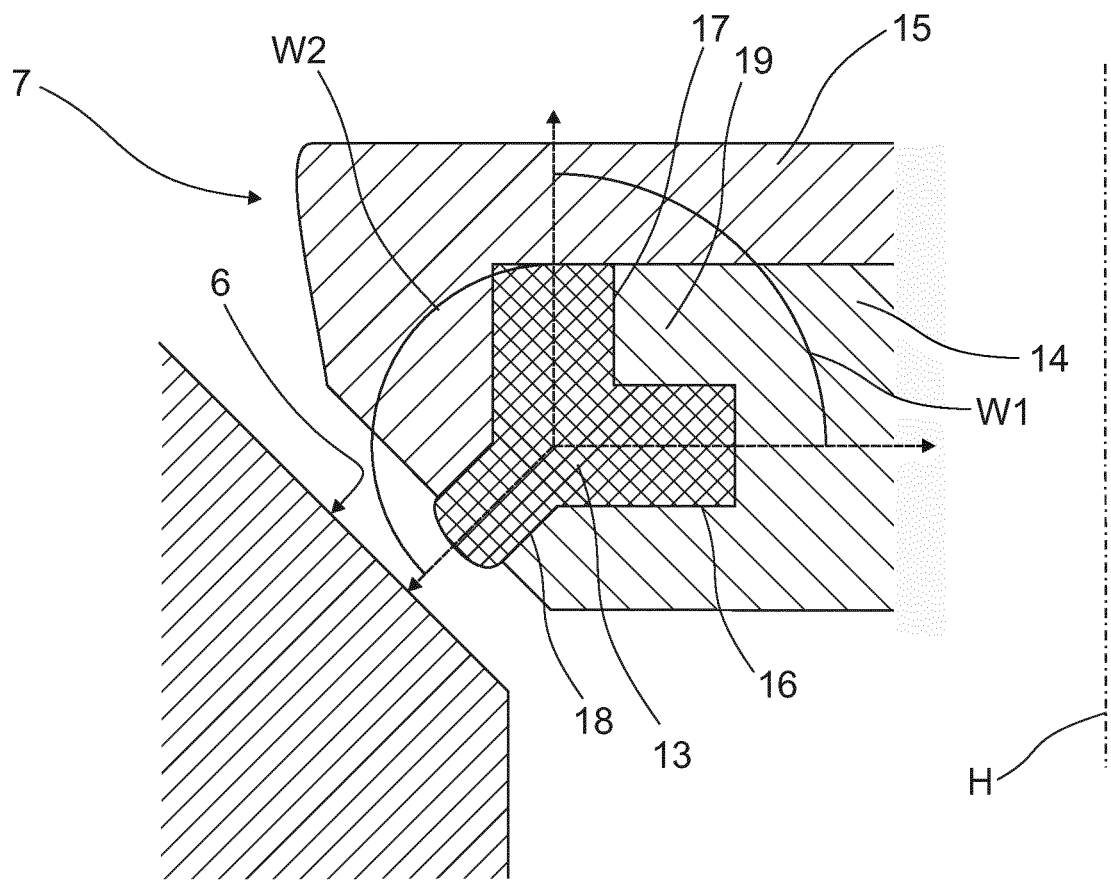
FIG. 2 shows a section showing part of the valve disk and valve seat, and showing the sealing arrangement.

FIG. 2 is a sectional view of a sealing arrangement that is provided on the closing element 7 and that receives the seal 13.

The sealing arrangement comprises a first part 14 and a second part 15, which are releasably interconnected, for example by means of threads on both parts 14 and 15 that are brought into engagement with one another.

The closing element 7 may be completely delimited with respect to an interior of the valve 1 by means of the first part 14, the second part 15, and the seal 13.

A first groove 16 is formed in the first part 14 and is oriented substantially perpendicularly to the lift axis H for ease of manufacture and cost advantage gain. The groove 16 may, for example, have a rectangular cross-section.

The first part 14 and the second part 15 are shaped such that a second groove 17 is formed between them in the assembled state, which second groove 17 is formed substantially cylindrically around the lift axis H and may have a rectangular cross-section.

The first groove 16 and the second groove 17 are at an angle W1 to one another, which may be approximately 90 degrees. This angle is advantageous with regard to manufacture. Both grooves 16 and 17 are interconnected. A clamping gap 18 formed between the first part 14 and the second part 15 branches off from the connection point. The clamping gap 18 is at an angle W2 to the second groove 17, which may preferably be approximately 135 degrees.

A supporting body 19 is formed between the first groove 16 and the second groove 17 on the closing element 7, for example on the first part 14 and integrally therewith. The supporting body 19, together with the clamping gap 18, substantially lies on a line that is preferably perpendicular to the valve seat 6. The supporting body 19 improves the flow of force within the seal 13 in the event of loading in the closed position of the valve 1 when the seal 13 is in contact with the valve seat 6. In particular, the supporting body 19 prevents the seal 13 from being completely pressed into the clamping gap 18 and fluid from entering the clamping gap 18. Moreover, the supporting body 19 provides for precise orientation of the seal 13 in the sealing arrangement.

The seal 13 is received in the first groove 16, the second groove 17, and the clamping gap 18, and fills the same preferably as completely as is technically feasible. A filling degree closer to 100% than to 95% is desirable. This renders the sealing arrangement particularly hygienic because no impurities can be taken in. The seal 13 projects from the clamping gap 18 toward the valve seat 6.

Figure 3:
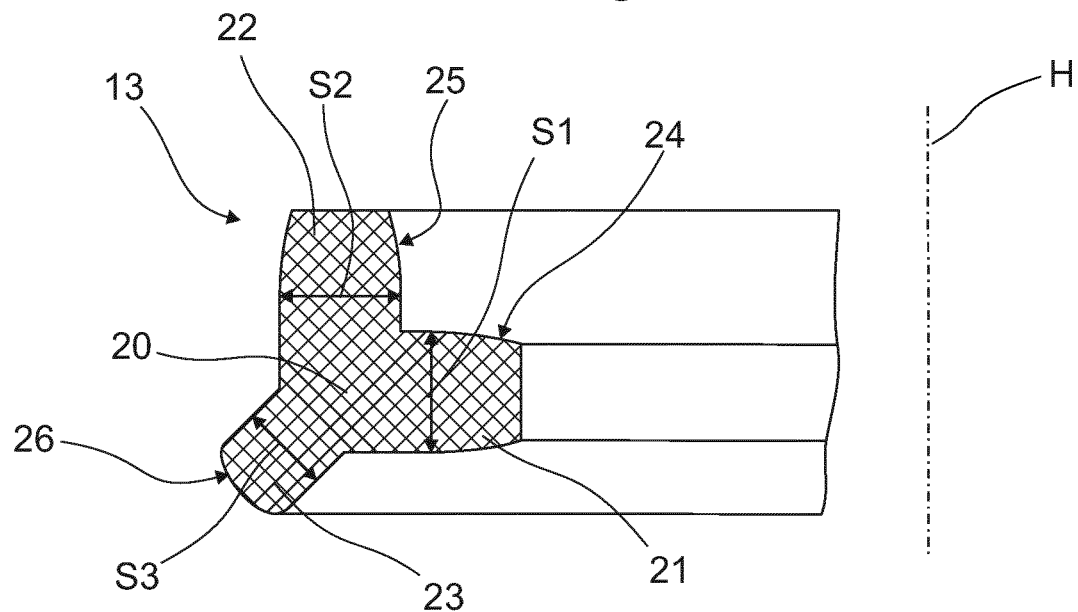
FIG. 3 shows a section through the seal.

FIG. 3 shows a cross-section through the seal 13.

The seal 13 comprises a core 20, which extends in the manner of a ring around a central axis that largely coincides with the lift axis H in the installed state. When viewed in cross-section, a first leg 21, a second leg 22, and a third leg 23 branch off from this core 20.

The first leg 21 substantially lies in a plane that is spanned by the core 20 and that extends toward the center of the core 20. This leg is received by the first groove 16 in the sealing arrangement and largely fills the first groove 16.

The second leg 22 approximately forms a right angle with the first leg 21 and is received by the second groove 17 when the seal 13 is installed in the sealing arrangement. The second leg 22 in turn largely fills the second groove 17.

The first leg 21 and the second leg 22 form a pair on account of the intermediate angle. The third leg 23 is arranged on the side of the core 20 that is opposite said pair and can be received in the clamping gap 18.

In an advantageous development, the first leg 21 may comprise a first taper 24 by means of which a first width S1 decreases from the core 20 to the free end of the first leg 21. At its maximum, the first width S1 is larger than the free diameter of the first gap 16. The second leg 22 may comprise a second taper 25 by means of which a second width S2 decreases toward the free end. The width S2 of the second leg is somewhat larger than the width of the second groove 17. On account of these measures, the grooves 16 and 17 can be filled to a very high degree.

The width S3 of the third leg 23 is smaller than each of the widths S1 and S2 of each of the first leg 21 and the second leg 22. The width S3 is larger than the width of the clamping gap 18. By virtue of these dimensions, the third leg 23 and the wall of the clamping gap 18 contact one another in a secure manner in every operating state of the valve 1. As a result, fluid is prevented from accumulating in this region.

The third leg 23 comprises a rounded portion 26 on the surface thereof that comes into contact with the valve seat 6. As a result, the sealing effect of the seal 13 is as linear as possible.

Figure 4:
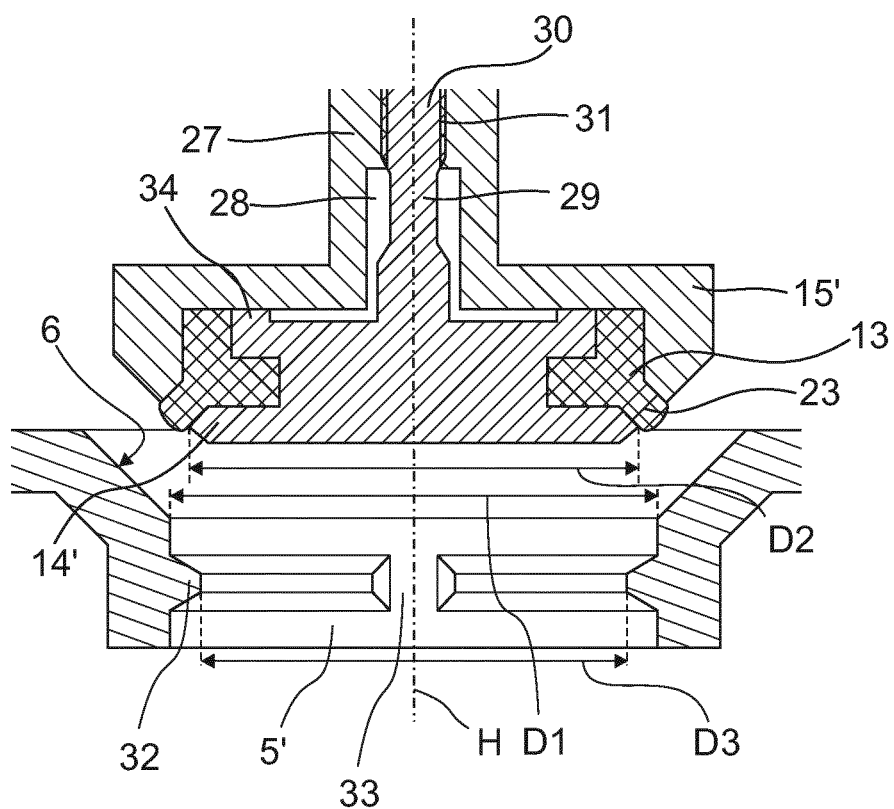
FIG. 4 shows a section showing the region comprising the valve disk and valve seat in one development.

FIG. 4 shows a section through the region comprising the valve disk and valve disk in one development.

The second part 15' comprises, on a side facing away from the first part 14', a portion 27 in which a cavity 28 is formed. An expansion portion 29 of the first part 14' is received in this cavity 28. A threaded portion 30 adjoins the elastically expandable expansion portion on a side facing away from the valve seat, which threaded portion is engaged in a hole 31 provided with a thread. On account of this engagement, a screw connection between the first part 14' and the second part 15' is produced. The expansion portion 29 acts like an expansion screw in this screw connection. As a result, the first part 14' and the second part 15' are securely screwed to one another, making it possible to dispense with means for preventing the parts from twisting relative to one another. In addition, this screw connection is easy to fit and cannot become released of its own accord while the valve is in use.

The screw connection is further unburdened and thus the above-mentioned advantage is enhanced in that the closing element is designed to guide the flow of the closing force past the screw connection in the closed state of the valve.

In an advantageous embodiment, this is achieved in that an inner width D1 of the valve seat 6 is at least as large as an outer width D2 of the first part 14'. As a result, only the seal 13, at most together with the second part 15', rests on the valve seat 6, whereas the first part 14' cannot rest thereon at all. The closing force introduced by means of the actuator 8 acts only on the second part 15' of the closing element and on the seal 13, while bypassing the hole 31 and the first part 14' with the expansion portion 29 and threaded portion 30. The connection between the first part 14' and the second part 15' is therefore not loaded by the closing force.

This embodiment can advantageously be combined with a projection 32 formed in the passage 5'. This projection 32 creates a narrowing having an inner width D3, which is smaller than an outer width D2 of the first part 14'. This prevents the first part 14' from being able to penetrate into the passage 5', for example if the connection between the first part 14' and second part 15' should fail. The projection 32 only extends over part of the circumference of the passage 5'. A plurality of projections may be arranged around the circumference. Advantageously, at least one outlet 33 is provided, which is aligned with a wall of the passage 5'. The outlet 33 has a shape that ensures residue-free drainage of the valve.

In order to ensure a secure screw connection, in particular with an expansion portion 29, it is advantageous if contact surfaces are provided on the first part 14' and the second part 15', by means of which the parts 14' and 15' can be supported and braced against one another. It is particularly advantageous to provide a step 34 on the first part 14' that is arranged circumferentially on a side of the first part 14' facing the second part 15'. The contact between the parts 14' and 15' is limited to an annular surface. This simplifies manufacture, since a step of this kind is easy to produce with a high degree of precision. The step 34 precisely defines a shape of the second groove 17 and clamping gap 18, which results in a precise hold and deformation of the seal 13.

The reference numbers using in the drawing figures are listed below.
1 Valve
2 Valve housing
3 First connection
4 Second connection
5, 5' Passage
6 Valve seat
7 Closing element
8 Actuator
9 Drive rod
10 Piston
11 Spring
12 Valve control apparatus
13 Seal
14, 14' First part
15, 15' Second part
16 First groove
17 Second groove
18 Clamping gap
19 Supporting body
20 Core
21 First leg
22 Second leg
23 Third leg
24 First taper
25 Second taper
26 Rounded portion
27 Portion
28 Cavity
29 Expansion portion
30 Threaded portion
31 Hole
32 Projection
33 Outlet
34 Step
H Lift axis
W1 First angle
W2 Second angle
S1 First thickness
S2 Second thickness
S3 Third thickness
D1 Inner width of valve seat
D2 Outer width of part 14
D3 Width of narrowing

The invention claimed is:
1. A lifting valve, comprising:
a first connection;
a second connection;
a passage connecting the first connection to the second connection and surrounded by a valve seat;
a closing element that can be brought into sealing contact with the valve seat; and
an actuator for bringing about the sealing contact, wherein:
the closing element comprises a sealing arrangement comprising a first part and a second part that is releasably connected to the first part,
a first groove formed in the first part, a second groove, and a clamping gap, wherein the second groove and the clamping gap are formed between the first part and the second part, and
a seal is received in the sealing arrangement, the seal comprising a ring that has a cross-section having a core, a first leg, a second leg, and a third leg, wherein:
the legs branch off from the core,
the first leg points toward a center of the ring and forms a pair with the second leg,
the first leg and the second leg are at an angle of 90° to one another,
the third leg is arranged on a side of the core that is opposite the pair,
the third leg is less thick than the first and second legs,
the first leg is received in the first groove,
the second leg is received in the second groove, and
the third leg is received in the clamping gap.
2. The lifting valve according to claim 1, wherein the degree to which the first groove, the second groove, and the clamping gap are filled is more than 95%.
3. The lifting valve according to claim 1, wherein the degree to which the first groove, the second groove, and the clamping gap are filled is more than 98%.
4. The lifting valve according to claim 1, wherein the first groove and the second groove are at an angle of 90° to one another.

5. The lifting valve according to claim 4, wherein the clamping gap is at an angle of 135° to the second groove.

6. The lifting valve according to claim 4, wherein, in order to releasably connect the first part and the second part, the first part comprises a threaded portion that adjoins one end of an expansion portion and that is received in a hole arranged on the second part.

7. The lifting valve according to claim 4, wherein a projection is provided in the passage, and the projection creates a narrowing having an inner width that is smaller than an outer width of the first part.

8. The lifting valve according to claim 1, wherein the clamping gap is at an angle of 135° to the second groove.

9. The lifting valve according to claim 1, wherein, in order to releasably connect the first part and the second part, the first part comprises a threaded portion that adjoins one end of an expansion portion and that is received in a hole arranged on the second part.

10. The lifting valve according to claim 9, wherein the closing element is designed to guide a flow of force past the threaded portion and the hole in a closed state of the valve.

11. The lifting valve according to claim 10, wherein an inner width of the valve seat is at least as large as an outer width of the first part.

12. The lifting valve according to claim 1, wherein a projection is provided in the passage, and the projection creates a narrowing having an inner width that is smaller than an outer width of the first part.

* * * * *